(12) United States Patent
Samie et al.

(10) Patent No.: US 7,681,675 B2
(45) Date of Patent: Mar. 23, 2010

(54) HYBRID DRIVE POWERTRAINS WITH REDUCED PARASITIC LOSSES

(75) Inventors: Farzad Samie, Franklin, MI (US); Joel M. Maguire, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 143 days.

(21) Appl. No.: 11/957,844

(22) Filed: Dec. 17, 2007

(65) Prior Publication Data

US 2009/0152028 A1 Jun. 18, 2009

(51) Int. Cl.
*B60K 8/00* (2006.01)
(52) U.S. Cl. ............... 180/65.1; 180/65.21; 180/65.235
(58) Field of Classification Search ......... 180/308, 180/65.25, 65.27, 65.285, 65.265, 65.275, 180/65.1, 65.235; 903/912, 913, 914, 916; 475/5, 276, 277, 110
See application file for complete search history.

(56) References Cited

U.S. PATENT DOCUMENTS

| | | | |
|---|---|---|---|
| 5,385,042 A * | 1/1995 | La Belle | 73/116.06 |
| 5,971,092 A * | 10/1999 | Walker | 180/308 |
| 6,081,042 A | 6/2000 | Tabata et al. | |
| 6,278,915 B1 | 8/2001 | Deguchi et al. | |
| 6,308,794 B1 | 10/2001 | Oppitz | |
| 6,575,866 B2 * | 6/2003 | Bowen | 475/5 |
| 6,609,056 B1 * | 8/2003 | Czarnecki et al. | 477/110 |
| 6,702,709 B2 * | 3/2004 | Bowen | 475/277 |
| 6,716,126 B2 * | 4/2004 | Bowen | 903/916 |
| 6,857,985 B2 * | 2/2005 | Williams | 180/65.25 |
| 2002/0173401 A1 * | 11/2002 | Bowen | 475/269 |
| 2005/0261101 A1 * | 11/2005 | Yoshioka | 475/231 |
| 2009/0098976 A1 * | 4/2009 | Usoro et al. | 477/5 |

FOREIGN PATENT DOCUMENTS

JP 2007261348 A 10/2007

OTHER PUBLICATIONS

PCT Search Report-PCT/US2008/086502 dated Jul. 6, 2009.

* cited by examiner

*Primary Examiner*—Hau V Phan

(57) ABSTRACT

An apparatus for reducing parasitic losses in a hybrid electric powertrain of a vehicle includes a drivetrain, an electric motor, and a connecting mechanism operative to selectively engage and disengage the drivetrain and the electric motor.

15 Claims, 4 Drawing Sheets

HYBRID DRIVE POWERTRAINS WITH REDUCED PARASITIC LOSSES

TECHNICAL FIELD

This disclosure is related to increasing efficiency of vehicles equipped with hybrid drive powertrains.

BACKGROUND

Hybrid drive powertrains utilize electric motors to substitute, augment, and recover energy from other sources of driving energy, such as from an internal combustion engine. An electric motor may be utilized by attaching the motor to a drivetrain through a transmission device, such as a transmission gear set. Use of an electric motor in this manner enables the control systems of a vehicle to utilize various control schemes aimed at improving fuel efficiency of the vehicle. However, those having ordinary skill in the art will appreciate that any mechanical system attached to a drivetrain by a set of gears increases overall losses to friction and requires more energy to accelerate due to an increase in rotational inertia. An electric motor and gears associated with attachment to a drivetrain spin with a spinning drivertrain regardless of whether the electric motor is in use or not. These inefficiencies caused by spinning the unused electric motor reduce the overall fuel effectiveness of employing a hybrid drive powertrain.

SUMMARY

An apparatus for reducing parasitic losses in a hybrid electric powertrain of a vehicle includes a drivetrain, an electric motor, and a connecting mechanism operative to selectively engage and disengage the drivetrain and the electric motor.

BRIEF DESCRIPTION OF THE DRAWINGS

One or more embodiments will now be described, by way of example, with reference to the accompanying drawings, in which.

DETAILED DESCRIPTION

Figure 1:
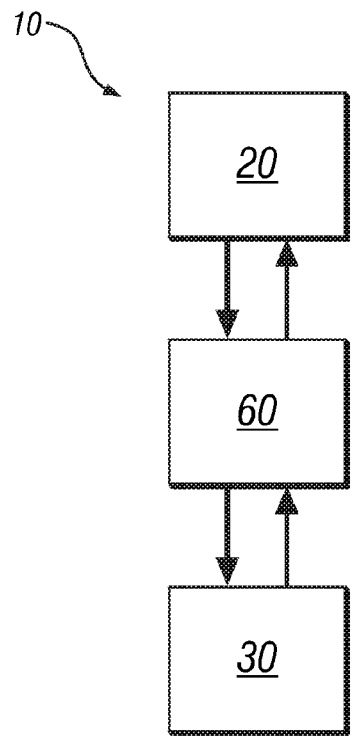
FIG. 1 is a schematic diagram exemplifying a hybrid drive powertrain in accordance with the present disclosure.

Referring now to the drawings, wherein the showings are for the purpose of illustrating certain exemplary embodiments only and not for the purpose of limiting the same, FIG. 1 schematically illustrates an exemplary embodiment of a known hybrid drive powertrain 10 in accordance with the disclosure. Hybrid drive systems utilize an electric motor in conjunction with another power source to propel the vehicle.

In this particular embodiment, hybrid drive powertrain 10 comprises electric motor 20, drivetrain 30, and transmission gear set 60. Electric motor 20 may operate to add power to drivetrain 30 in a drive mode, or electric motor 20 may operate to receive power from drivetrain 30 in order to recover energy to a battery in a recovery mode. Electric motor 20 is connected to a transmission gear set 60 operative to establish a gear reduction ratio between said electric motor and said drivetrain and to transfer torque between electric motor 20 and drivetrain 30.

Figure 2:
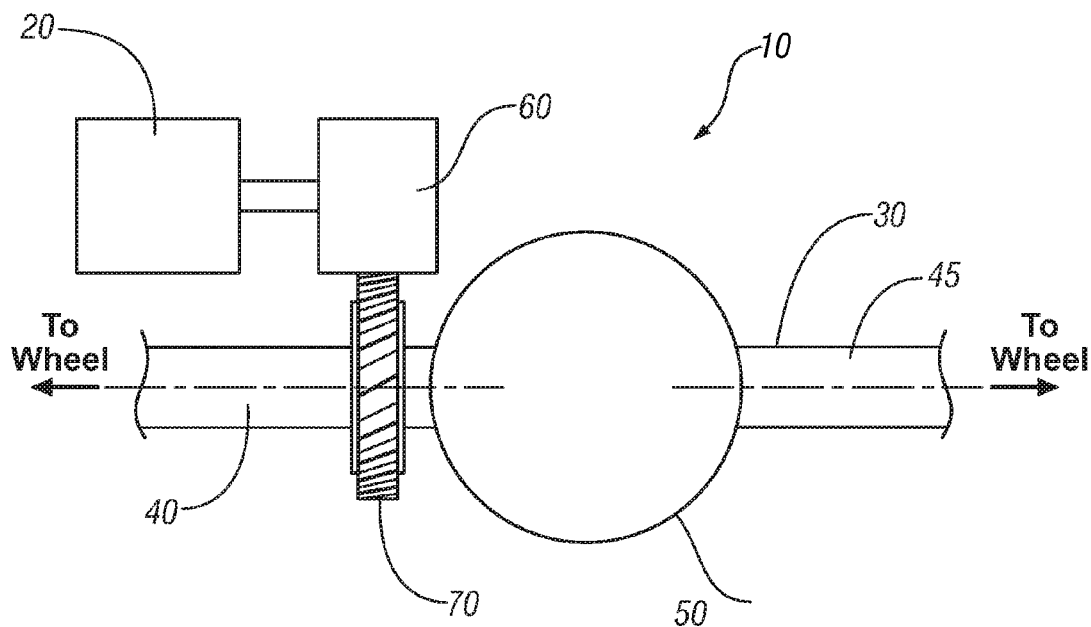
FIG. 2 is an plan view of an exemplary hybrid drive powertrain in accordance with the present disclosure.

FIG. 2 illustrates an exemplary embodiment of a known hybrid drive powertrain 10. In this embodiment, drivetrain 30 comprises a first axle 40, a second axle 45, and a differential device 50 operative to transmit torque between the axles. First axle 40, second axle 45, and differential device 50 operate to turn the wheels of the vehicle and may be attached to either the front or rear wheels. Transmission gear set 60 is connected to drivetrain 30 in this particular embodiment by an input gear 70 that is physically attached to first axle 40. However, it should be appreciated that transmission gear set 60 may be attached to drivetrain 30 in various configurations, and this disclosure is not meant to be limited to embodiments utilizing input gear 70. Further, the point at which the transmission gear set interacts with the drivetrain is not meant to be limited to first axle 40, and alternative embodiments, such a connection through the automatic transmission of the vehicle or through the primary axle, are additionally envisioned.

While the connection of electric motor 20 to drivetrain 30 allows the use of various control schemes to make the operation of the vehicle more efficient, electric motor 20 and any associated gears must spin with drivetrain 30, whether electric motor 20 is in use or not. The spinning of electric motor 20 and the associated gears when electric motor 20 is not in use creates parasitic loss in the hybrid drive powertrain, where extra fuel from an engine or extra battery power from additional electric motors must be used to overcome losses associated with spinning the motor. This parasitic loss reduces the fuel effectiveness of hybrid drive powertrain 10.

Figure 3:
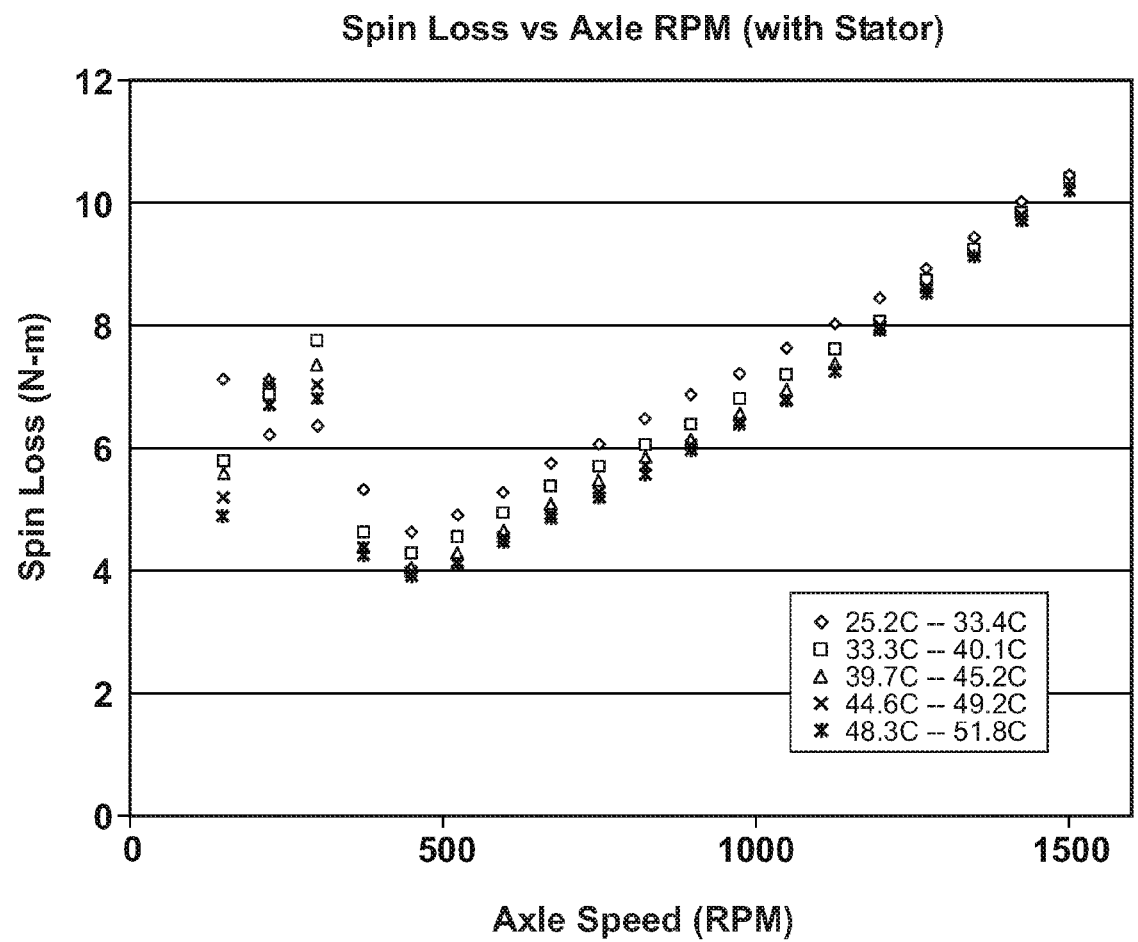
FIG. 3 is a graphical representation of test results exemplifying spin losses in a known system as depicted in FIGS. 1 and 2 in accordance with the present disclosure.

FIG. 3 graphically represents exemplary test results showing spin losses inherent to a hybrid drive powertrain and the electric motor and associated gears as described in FIGS. 1 and 2 in accordance with the disclosure. These spin losses represent parasitic losses incurred by the spinning of the electric motor and associated gears which may be reduced or eliminated by selective engagement of the electric motor.

Figure 4:
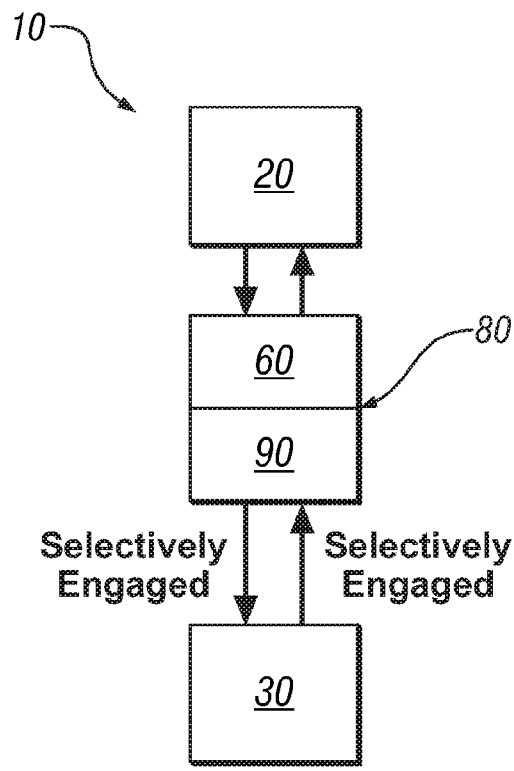
FIG. 4 is schematic diagram of an exemplary hybrid drive powertrain utilizing a connecting mechanism in accordance with the present disclosure.

FIG. 4 schematically illustrates a method for reducing parasitic loss utilizing a connecting mechanism 80 within hybrid drive powertrain 10 in accordance with the disclosure. Connecting mechanism 80 is located between electric motor 20 and drive train 30. Connecting mechanism 80 in this particular exemplary embodiment includes transmission gear set 60 and clutch mechanism 90. Connecting mechanism 80 selectively engages or disengages transmission gear set to drivetrain 30 and enables the reduction of parasitic losses when electric motor 20 is not in use.

Various methods may be utilized in connecting mechanism 80 for engaging and disengaging electric motor 20 from drivetrain 30. A first exemplary method includes adding a clutch mechanism 90 to input gear 70. This clutch mechanism 90 selectively allows input gear 70 to spin freely around first axle 40 of drivetrain 30 or engages input gear 70 to first axle 40. Clutch mechanism 90 may take many forms. Clutch mechanism 90 may be enabled by an electromagnetic coil, wherein energizing the coil will selectively engage the clutch mechanism. Embodiments utilizing electromagnetic clutches may be particularly advantageous due to the simplicity and flexibility of selecting engagement, wherein a control module might simply send a signal to engage the clutch. Clutch mechanism 90 may alternatively be mechanical, utilizing mechanisms tied to angular velocity or angular acceleration or operating similarly to well-known one-way clutch mechanisms. Clutch mechanism 90 may alternatively be viscously activated, utilizing fluid in a set of rotor devices to selectively engage input gear 70. Alternative methods of engagement may use a clutch mechanism placed on another gear or shaft away from input gear 70 within transmission gear set 60 or at electric motor 20. Another exemplary method for disengaging electric motor 20 from drivetrain 30 includes the use of a method within transmission gear set 60 simulating placing an automatic transmission in neutral.

Several alternative exemplary embodiments for implementing the selective engagement of clutch mechanism 90 are contemplated. Clutch mechanism 90, in one embodiment, may operate as a hybrid one-way clutch/electromagnetic coil mechanism. Such a hybrid clutch design would have a normal mode and a recovery mode corresponding, respectively, to the drive and recovery modes of electric motor 20. Operating under normal mode, the clutch would operate as a one-way clutch mechanism, allowing electric motor 20 to add power to drivetrain 30, but otherwise allowing electric motor 20 and associated gears to free-spin. Operating under recovery mode, the electromagnetic coil would be utilized to selectively engage the otherwise free-spinning hybrid clutch mechanism when drivetrain 30 needs to be engaged to electric motor 20 in order to recover power to the battery. In another embodiment, pairs of one-way clutches may be utilized to achieve different gear reduction ratios for electric motor 20 in drive mode or recovery mode. Preferred embodiments disengage from drivetrain 30 as many gears within transmission gear set 60 and input gear 70 as possible without incurring excessive wear upon the components and without expending excessive energy in the engagement and disengagement processes.

Figure 5:
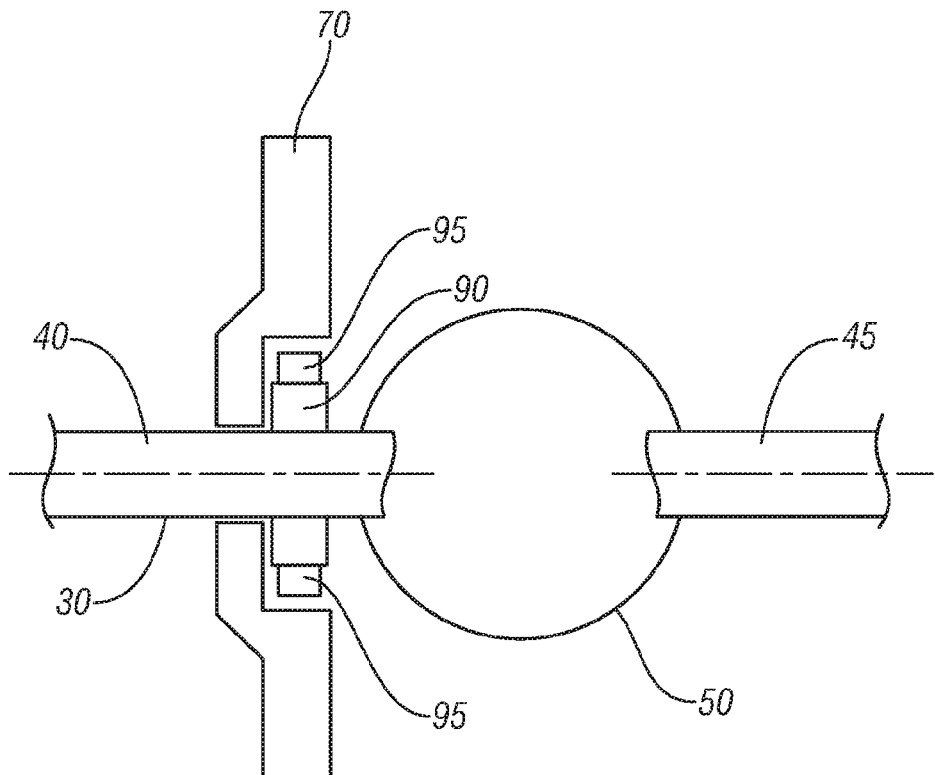
FIG. 5 is a sectional view of an exemplary arrangement of a drivetrain, input gear, and clutching mechanism in accordance with the present disclosure.

FIG. 5 cross-sectionally illustrates an exemplary embodiment of hybrid drive powertrain 10 utilizing a clutch mechanism 90 in coordination with input gear 70 in accordance with the disclosure. Drivetrain 30 comprises first axle 40, second axle 45, and differential device 50. Input gear 70 is located proximately to first axle 40 and is situated to spin freely therearound. Clutch mechanism 90 is fixed to first axle 40 and is comprised of several individual plungers 95. Upon activation of clutch mechanism 90, plungers 95 extend outward and grip to input gear 70, causing input gear 70 to cease spinning freely around first axle 40 and instead spin in unison with first axle 40. Upon deactivation of clutch mechanism 90, plungers 95 pull inward and release input gear 70, allowing input gear 70 to again spin freely around first axle 40.

Figure 6:
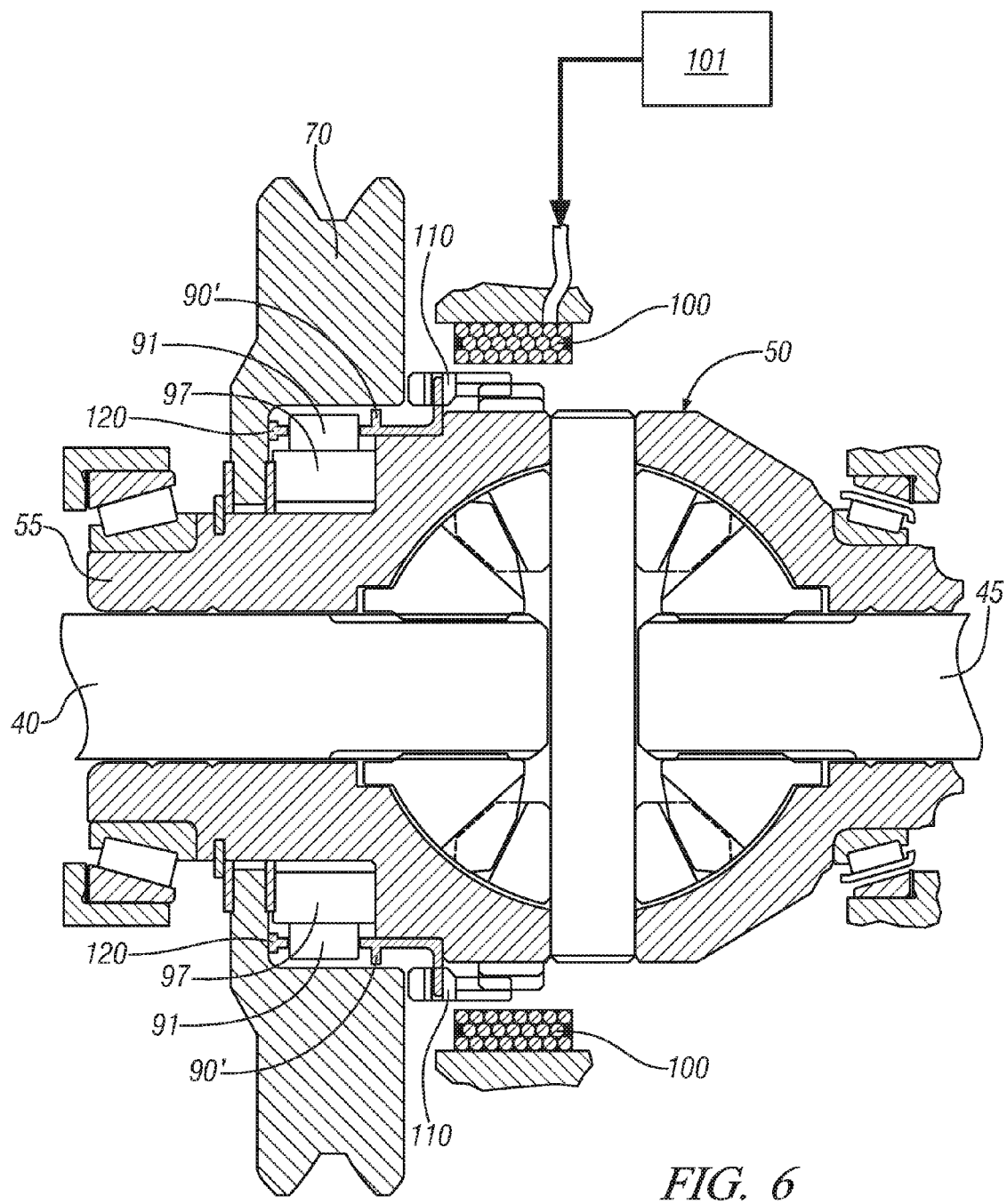
FIG. 6 is a sectional view of an exemplary arrangement of a drivetrain, input gear, and clutching mechanism utilizing magnetic coils for activation in accordance with the present disclosure.

FIG. 6 cross-sectionally illustrates an additional exemplary embodiment of a selectable one-way clutch mechanism 90' in accordance with the disclosure. As discussed above, input gear 70 need not be directly attached to first axle 40 and may take the form of alternate embodiments. In this particular embodiment, input gear 70 is situated around a pinion carrier 55, which is a sub-component of differential mechanism 50. Clutch mechanism 90' includes a roller cage 120 and a plurality of complementary rollers 91 and roller ramps 97. Roller ramps 97 are fixedly attached to pinion carrier 55. Clutch mechanism 90' is electromechanically activated by magnetic coils 100. Magnetic coils 100 may be selectively energized by a control module 101 based upon in which mode electric motor 20 is operating. Transference mechanisms 110 acts as an armature in conjunction with magnetic coils 100. Axial motion of the transference mechanisms 110 causes roller cage 120 to rotate in a direction in accordance with the direction of axial motion of the transference mechanisms 110 thereby causing the engagement or release of the rollers 91 between the ramps 97 and the input gear 70. Engagement of the rollers 91 between the ramps 97 and the input gear 70 allows for the transfer of torque to pinion carrier 55 from the input gear 70 and, subsequently, to first axle 40 and second axle 45 through differential mechanism 50. When the rollers 91 between the ramps 97 and the input gear 70 are disengaged, input gear 70 is allowed to spin freely around pinion carrier 55.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus for reducing parasitic losses in a hybrid electric powertrain of a vehicle, comprising:
    a drivetrain comprising a first axle, a second axle and a differential including a pinion carrier, wherein said differential is operative to transfer torque between said first axle and said second axle;
    an electric motor; and
    a connecting mechanism operative to selectively engage said drivetrain and said electric motor, said connecting mechanism comprising a selectable one-way clutch which when activated provides for one-way torque transfer from the electric motor to the pinion carrier.

2. The apparatus of claim 1, wherein said first axle, said second axle, and said differential device operate to turn rear wheels of said vehicle.

3. The apparatus of claim 1, wherein said connecting mechanism comprises a transmission gear set and a clutch mechanism.

4. The apparatus of claim 1, wherein said connecting mechanism selectively disengages said drivetrain and said electric motor when said electric motor is not in use.

5. The apparatus of claim 1, wherein said selectable one-way clutch comprises:
    a plurality of rollers and a roller cage;
    a plurality of roller ramps fixedly attached to the pinion carrier;
    an input member rotatably disposed about the pinion carrier;
    said roller cage rotatably disposed about the pinion carrier with the rollers oriented substantially between the roller ramps and the input member, and having a first rotational orientation wherein the rollers are engaged between the roller ramps and the input member and a second rotational orientation wherein the rollers are disengaged from the roller ramps and the input member.

6. A method for reducing parasitic losses in a hybrid electric powertrain, comprising:
    engaging an electric motor and a drivetrain when said electric motor is in use; and
    disengaging said electric motor and said drivetrain when said electric motor is not in use;
    wherein said drivetrain comprises a first axle, a second axle and a differential including a pinion carrier; and
    wherein said engaging comprises activating a clutch mechanism providing for torque transfer when activated between the electric motor and the pinion carrier.

7. The method of claim 6, wherein said activating said clutch mechanism is operative to fix a connecting mechanism to said drivetrain.

8. The method of claim 6, wherein said activating said clutch mechanism is operative to fix an input gear to said drivetrain.

9. The method of claim 6, wherein said disengaging allows said drivetrain to rotate independently from said electric motor.

10. The method of claim 6, wherein said electric motor is attached to a transmission gear set, and wherein said disengaging allows said drivetrain to rotate independently from said transmission gear set.

11. The method of claim 6, wherein said electric motor is in use during a drive mode.

12. The method of claim 11, wherein said electric motor is further in use during a recovery mode.

13. The method of claim 6, wherein said electric motor is in use during a recovery mode.

14. The method of claim 13, wherein said clutch mechanism comprises a control device operative to selectively engage said drivetrain and said electric motor when said electric motor is in a recovery mode.

15. The method of claim 14, wherein said control device is an electromagnetically activated device operative to engage on command from a control module.

\* \* \* \* \*